United States Patent [19]
Cooper

[11] Patent Number: 4,598,899
[45] Date of Patent: Jul. 8, 1986

[54] LIGHT GAUGE METAL SCRAP MELTING SYSTEM

[75] Inventor: Paul V. Cooper, Cleveland, Ohio

[73] Assignee: Kennecott Corporation, Cleveland, Ohio

[21] Appl. No.: 629,525

[22] Filed: Jul. 10, 1984

[51] Int. Cl.$^4$ .............................................. C22B 9/16
[52] U.S. Cl. .................................. 266/212; 266/235; 266/901
[58] Field of Search .............. 266/212, 233, 235, 901; 75/65 R, 68 R

[56] References Cited

U.S. PATENT DOCUMENTS

| | | | |
|---|---|---|---|
| 1,522,765 | 1/1925 | Wilke | 266/901 |
| 2,038,221 | 4/1936 | Kagi | 266/235 |
| 2,488,447 | 11/1949 | Tangen et al. | 266/235 |
| 2,515,478 | 7/1950 | Tooley et al. | 266/233 |
| 3,400,923 | 9/1968 | Howie et al. | 266/235 |
| 3,873,305 | 3/1975 | Claxton et al. | 75/68 R |
| 3,984,234 | 10/1976 | Claxton et al. | 266/235 |
| 3,997,336 | 12/1976 | van Linden et al. | 266/235 |
| 4,128,415 | 12/1978 | van Linden et al. | 266/901 |
| 4,286,985 | 9/1981 | van Linden et al. | 266/901 |
| 4,322,245 | 3/1982 | Claxton | 266/901 |

Primary Examiner—L. Dewayne Rutledge
Assistant Examiner—Robert L. McDowell
Attorney, Agent, or Firm—R. Lawrence Sahr

[57] ABSTRACT

Disclosed is a system for remelting light gauge scrap metals which includes a remelting furnace with separate heating and melting chambers and pump means for inducing circulation of molten metal between the two. Also included are auger means adapted to include light gauge "floating" scrap metal from the melt into the central zone of the melt.

13 Claims, 10 Drawing Figures

LIGHT GAUGE METAL SCRAP MELTING SYSTEM

BACKGROUND OF THE INVENTION

1. Field of the Invention

The present invention relates generally to the field of remelting metal scrap and specifically to the field of remelting lightweight aluminum scrap such as sheet metal scrap, machine shop turnings, and aluminum beverage cans.

2. Description of the Prior Art

A major concern of the secondary metal industry is the generation of oxides and gases which become included, entrained or dissolved into the molten metal during the remelting of scrap metal. These oxides are a source of concern in as much as the progeneration of oxides diminishes the proportion of remelted scrap metal which is ultimately marketable as end product. The percent of scrap rendered nonusable because of oxides generated during remelt is termed "melt loss."

Impurities form during remelting when the extremely reactive liquid metal surface area interfaces with reactive gases such as oxygen and hydrogen. A primary source of hydrogen and oxygen is the air and fuel gas combination used which is combusted to fire remelting furnaces. To combat impurities in the remelting of scrap metals, appropriate steps are taken to minimize the surface areas of reactive scrap metal exposed to reactive gases and means are employed to remove impurities by refining the molten metal with fluxes.

In the field of remelting scrap metals, the combative strategy used to prevent or inhibit the generation of oxides during remelting is generally as follows: Initially, a fluid bath of molten metal is formed in a furnace by remelting high-mass, low-surface area (heavy gauge) materials; then the bath is covered with a protective coating of flux and dross; then additional scrap is remelted by submerging such in the existing molten metal bath. Once the pool of molten metal has been established in the furnace it is brought to a preset level and drained off at a rate which is commensurate with additions of more scrap. The barrier coating which covers the bath is formed by fluxing the surface of the bath. The impurities, aided by the flux, float to the surface to form a crust or "dross" on top of the bath. The dross is in a solid or plastic state.

Directly beneath the dross, is a "skim" of semi-molten, semi-plastic metal which includes varying degrees of impurities. The skim and dross are normally removed either continuously or intermittently from the furnace to prevent large buildups, however it is considered beneficial to have some skim and dross on the top of the furnace to act as a barrier to prevent the additional combination of the molten metal underlying it with oxygen and other atmospheric gases. The skim and the dross that are removed from the furnace completely solidify and are either discarded or processed to reclaim entrapped metal.

The melting of scrap metal is an energy intensive process, and additional energy is required to convert and keep the metal scrap in the molten state. The form of energy used is heat, generated by an electric or a combustion source. The introduction of metal scrap to the heat generating areas is problematic in that great amounts of heat energy are lost both when relatively cold scrap metal is introduced to those heat generating areas and as those heat generating areas are exposed to the colder ambient air during the introduction of the scrap. In addition, impurities are generated when scrap is melted in intimate contact with fuel gases, combustion gases, and ambient air. As a general proposition metal melting furnaces have been redesigned in an attempt to specifically prevent heat loss when the heat generating area is exposed to ambient air, and furthermore to specifically prevent the fuel gases, combustion gases and ambient air from reacting with the melting scrap to form impurities.

One of the approaches to furnace modification has taken the form of fabricating an additional chamber, or "melting" chamber, exterior to the hearth, out of refractory materials. The refractory "walls" separate the burners from the melting chamber. Ports are built through the walls to permit molten metal flow between the melting chamber and the heating chamber. The ports are located below the fluid level normally set for the molten metal. The scrap is introduced into the melting chamber where it comes into contact with the molten metal. Using such an approach, the scrap is always secluded from the detrimental effects of the burners and the burners do not lose valuable heat energy to the ambient air.

In attempting to utilize such separate chamber designs for the remelting furnaces, it has been determined that natural convection of the molten metal by itself, through the ports in the walls between the separate chambers, is not adequate to transfer heat at a rate which is sufficient to both maintain the molten metal in the melting chamber in the molten state and to melt the solid phase scrap metal which is being added. Attempts have been made to utilize special refractory compositions which are designed to transfer the heat from the heating chamber into the melting chamber, with limited success, resulting in only relatively small quantities of scrap being successfully added without reducing the melt temperature below acceptable levels. The addition of special molten metal pumps is ultimately required to insure that the temperatures within the melting chambers are maintained high enough so that solidification does not begin to occur.

Such pumps, which are commercially available, are normally made from graphite or other refractory materials which resist deterioration. The addition of the molten metal circulation pump to the separate chamber melting furnace system described above enables the melting and the commercial application of this system to the remelting of relatively heavy gauge scrap. However, there has been an increasing market use of low-mass, high-surface area (light gauge) metals, resulting in increasingly greater quantities of light gauge scrap being available for recycling. In particular, there has been a great increase in the use of aluminum for beverage cans. With the remelting of light gauge scrap, additional problems are encountered and new approaches are needed to reduce melt losses to acceptable levels.

Molten metal is characterized by very high surface tension. Generally speaking, in metal remelting furnaces, heavy gauge scrap is dropped into the molten metal and, by gravity, rapidly sinks into the fluid where it melts. Due to the surface tension and the dross and skim on the top of molten metals, it is more difficult to include light gauge scrap into the fluid because of the fact that it tends to "float" for an extended period of time on the surface. Much of the light gauge scrap that is used is lost to oxidation and other chemical reactions as it begins to melt on the surface. It has been recognized that means are needed to quickly overcome the surface tension, thus ways are required to introduce light gauge scrap through the dross and skim into to melt beneath.

Initially, attempts were made to mechanically push the light gauge scrap under the molten metal surface. Also, attempts have been made to compress the light gauge scrap into large bundles followed by mechanically forcing the large bundle under the molten metal surface. Both of these methods have been unsuccessful due to excessive melt loss and low scrap metal melting and recovery rates. Beyond these initial attempts, improved methods have been developed to introduce the light gauge scrap beneath the molten metal surface in a separate melting chamber type furnace design.

An example of such an improved system is found in U.S. Pat. No. 4,286,985 wherein the molten metal is pumped from the heating chamber and directed into the upper portion of the melting chamber, thus providing both relatively hot molten metal at the upper portion of the molten pool in the melting chamber and creating a tumbling action in that chamber which has the purpose of swirling the scrap on the surface of the melt down into the melt itself.

Other designs have been introduced which include a variety of pump impeller arrangements designed to be placed directly into the melting chamber substantially below the surface level of the molten metal pool. Examples of such designs are found in U.S. Pat. Nos. 3,984,234, 4,128,415, and 4,322,245. In all of these designs, the scrap metal floating on the surface of the molten metal is drawn into the center of the molten pool by way of a fluid vortex created by the submerged impeller of the pump in that pool. The pump impellers of such systems serve the additional purpose of circulating the molten metal from the melting chamber into the heating chamber and from the heating chamber back into the melting chamber.

These systems have proved somewhat successful in that relatively more light gauge metal scrap can be drawn into the melt without exposure to contamination and oxidation as such material is melting. However these systems have not been entirely successful in practice because, when the impellers are driven at a sufficient speed to draw substantially all of the light gauge scrap rapidly down into the molten pool, a severe vortex is created. This severe vortex tends to also draw the surrounding atmospheric gases into the melt by suction. These gases combine readily with the molten metals to form high levels of impurities. This phenomenon is detailed in U.S. Pat. No. 4,322,245 column 4, lines 42-50. Thus there is a need for a system which will positively drive all of the light gauge scrap into the molten metal without inclusion of atmospheric gases and while also providing good molten metal circulation from the heating chamber to the melting chamber.

SUMMARY OF THE INVENTION

The present invention is a system for remelting light gauge scrap metals. The system includes a remelting furnace which is separated into a heating chamber and a melting chamber. There is a heating means, for example a burner, associated with and operable on the heating chamber, but separated from the melting chamber. There are no burner means directed at the surface of the molten metal in the melting chamber. Port means are included in a heat resistant separator wall between the heating chamber and the melting chamber which serve to permit the circulation of molten metal from the heating chamber into the melting chamber and then back from the melting chamber into the heating chamber. The circulation of the molten metal is provided by molten metal pumping apparatus positioned to direct the flow of molten metal from the heating chamber into the melting chamber. Auger means are included within the melting chamber which operate to produce a gravity flow of the surface of the molten metal in the melting chamber, including the light gauge aluminum scrap floating on the surface of that molten metal, downwardly into the portions of the molten metal pool which are below that surface (the central zone at the molten metal pool). Concurrent with the gravity flow, there is produced a mechanical augering which mechanically forces the light gauge scrap metal down into that central zone of the molten metal pool.

These features, as well as other features of the present invention, will be more completely disclosed and described in the following specification, the accompanying drawings and the appended claims.

DETAILED DESCRIPTION

Figure 1:
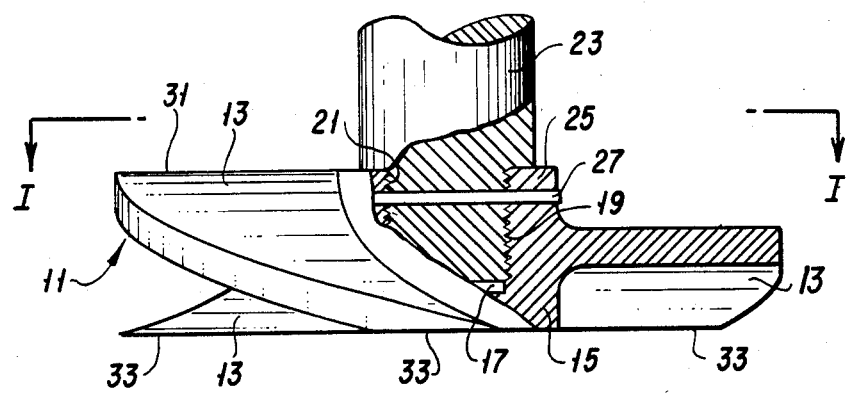
FIG. 1 illustrates an elevational view of the auger as mounted to a section of the drive shaft with portions cut away.

Referring to FIG. 1, auger 11 is shown in a partially cut-away view. Auger 11 comprises three blades 13 and hub 15. Auger 11 is generally in the form of an axial flow turbine and each of the three blades is formed as a spiral flute which comprises a spiral section. Hub 15 includes a blind bore 17 which is machined with internal threads 19 to accept external matching threads of drive shaft 23. When drive shaft 23 is assembled by threading into hub 15 the assembly is cross-bored 25 and pin 27 is inserted to prevent auger 11 from becoming detached from drive shaft 23 in operation.

Figure 2:
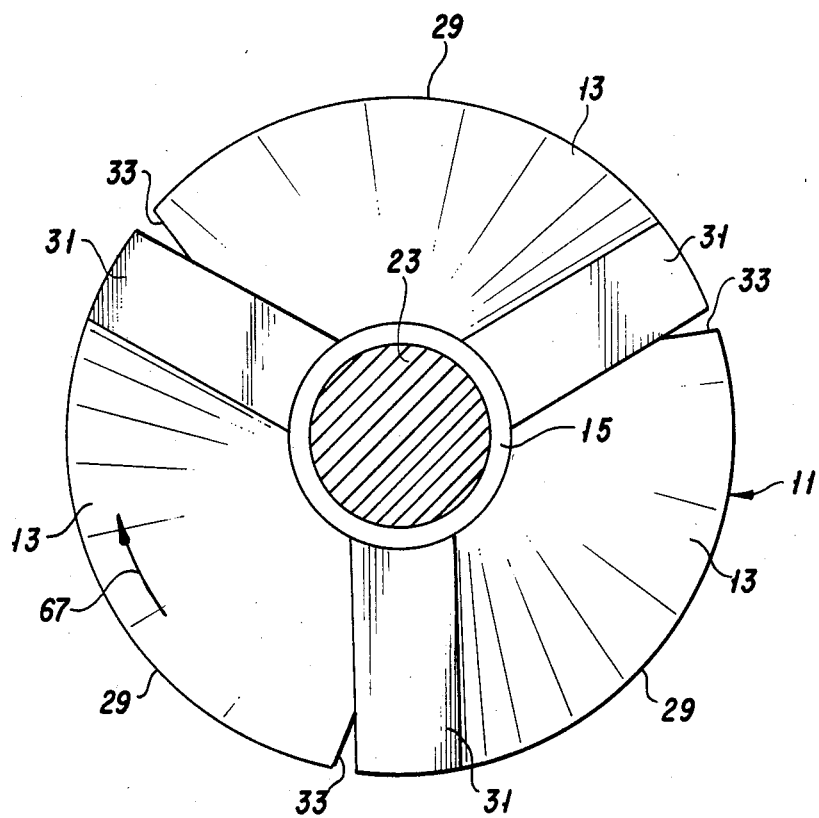
FIG. 2 illustrates a plan view of the auger as viewed from I—I of FIG. 1.

Referring to FIG. 2, the outer edges 29 of blades 13 are concentrically machined with bore 17 to permit auger 11 to be fitted into a cylindrical shape. Leading edges 31 and trailing edges 33 are machined in parallel planes perpendicular to the outer edges 29 of blades 13.

Figure 6:
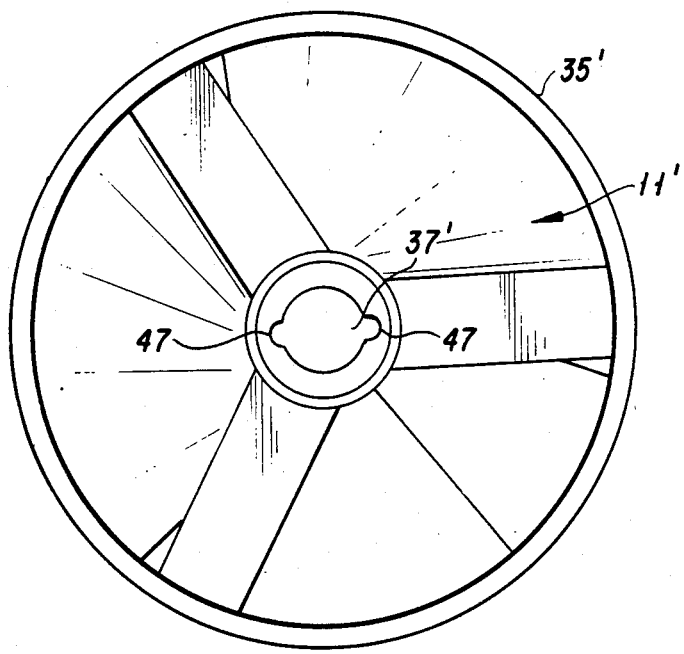
FIG. 6 is a plan view of the alternate embodiment of the auger assembly as illustrated in FIG. 5.

In the present invention, the auger 11 requires at least one blade 13 although three are preferable. It is important, however, that the leading edge 31 of each blade 13 extends circumferentially around the outer edge 29 of the auger to the extent that it overlaps the trailing edge 33 of the next adjacent blade 13 as is best shown in FIGS. 2 and 6. In a situation where a single blade 13 is used, the leading edge 31 of that blade would extend circumferentially around the outer edge 29 of that blade 13 to the extent that it would overlap the trailing edge of that same blade 13.

Figure 3:
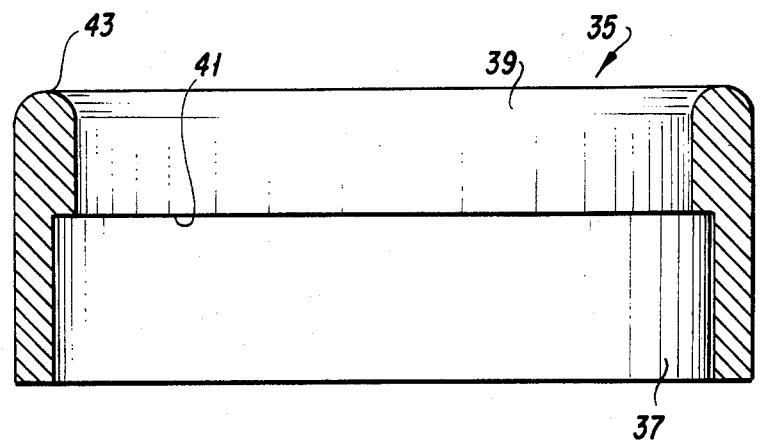
FIG. 3 is an elevational cross-sectional view of the auger drum.

Referring to FIG. 3, there is illustrated an auger drum 35 which is generally a hollow cylindrical section shape, being axially bored and counterbored as shown in that figure. Bore 37 is sized to permit drum 35 to be placed over auger 11 as is shown in FIG. 5. Counterbore 39 is of a lesser size in diameter such that lip 41 is formed. Lip 41 rides on the leading edges 31 of blades 13 as shown in FIG. 4.

Figure 4:
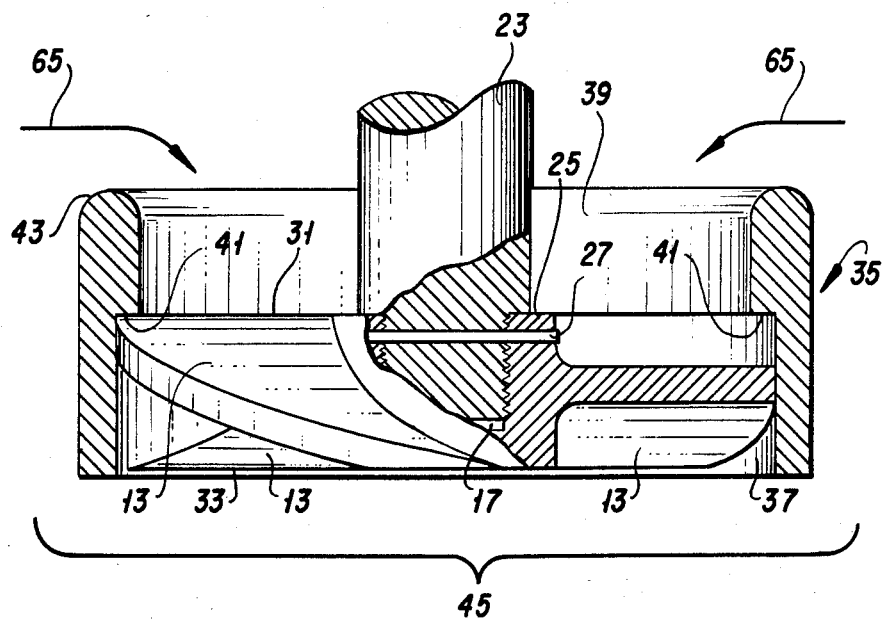
FIG. 4 illustrates the auger assembly including a cross-sectional view of the auger drum and cut-away view of the auger and drive shaft.
Figure 5:
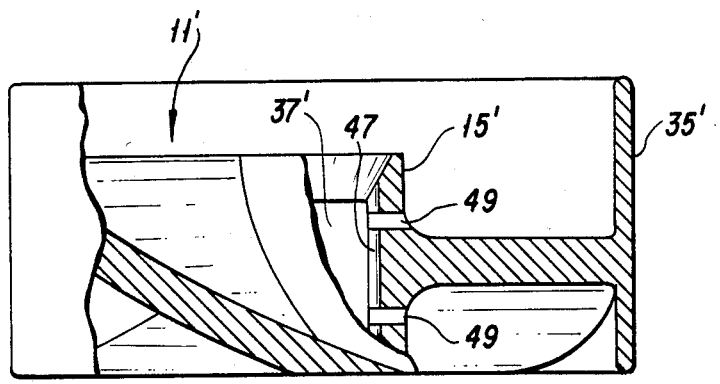
FIG. 5 is an elevational, partly cut-away view of an alternative embodiment of the auger assembly wherein the auger drum and the auger are a single piece.

As illustrated in FIGS. 3 and 4, the upper edge of the drum is machined to radius 43. Drum 35 is attached to auger 11 by way of refractory cement. Alternatively, drum 35 may be cross-bored into the outer edges 29 of auger 11 and a pin inserted, none of which is shown in the drawing figures. The combination of auger 11, drive shaft 23 and drum 35, as described hereinabove, are referred to collectively hereinafter as the auger assembly 45.

Referring to FIGS. 5 and 6 there is shown an alternative embodiment of the auger assembly of the present invention including a one piece combined auger 11' and drum 35'. There is an additional difference in this alternative design in that hub 15' has a bore 37' which extends axially all the way through. Referring to FIG. 6, the bore 37' also includes keyways 47. In this alternative embodiment, the drive shaft (not shown) is not threaded into hub 15' but, rather, is locked in place by way of keys (not shown) which fit into corresponding keyways in the drive shaft (not shown) and the keyways 47 of hub 15' of FIGS. 5 and 6, respectively. In addition, cross-bores 49' may also be used extending through the walls of hub 15' and through the portion of drive shaft 23' which is fitted within the bore 37' of hub 15'. In all other respects, the auger assembly is as illustrated and described in regard to FIGS. 1-4.

Figure 7:
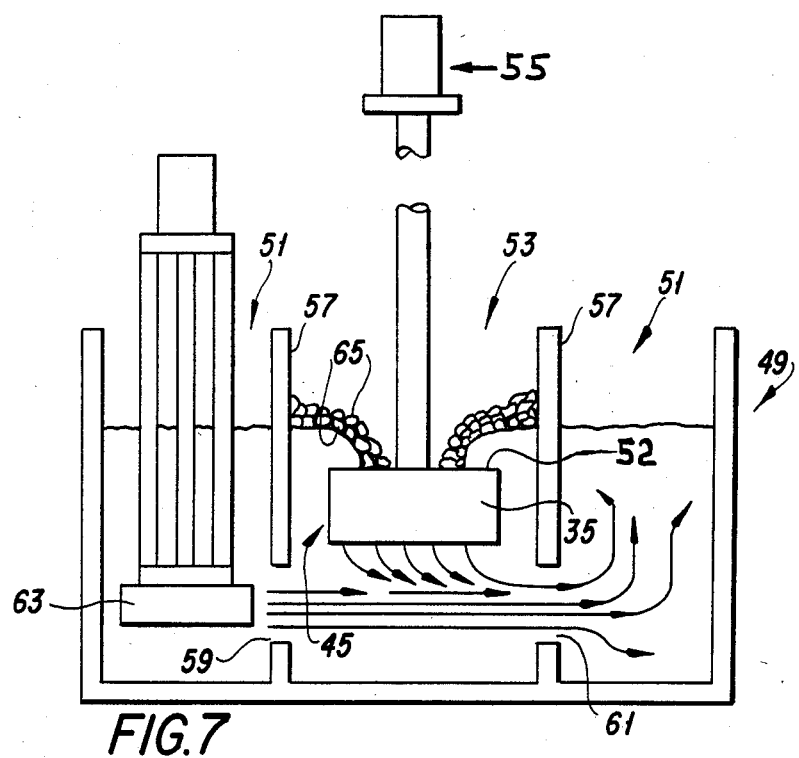
FIG. 7 is an elevational cross-sectional schematic of the light gauge metal scrap melting system.
Figure 8:
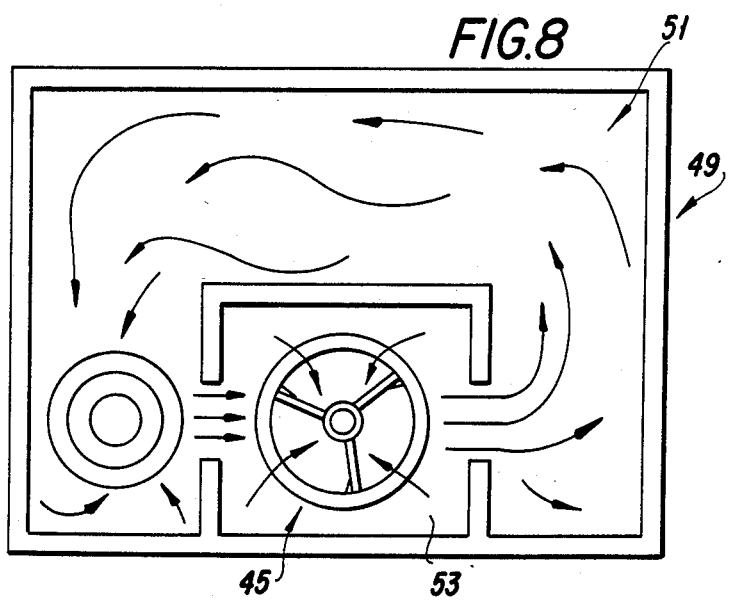
FIG. 8 is a plan view schematic of the light gauge metal scrap melting system.

FIGS. 7 and 8 show, respectively, an elevational view, in schematic form, of the system of the invention and a plan view, also in schematic form, of the system of the invention. Remelting furnace 49 includes a heating chamber 51 and a melting chamber 53. Interposed into and positioned about the center of melting chamber 53 is auger assembly 45 which is rotated by a power drive assembly 55 such as, for example, an electric motor. The wall 57 which separates the heating chamber 51 from the melting chamber 53 includes entrance flow port 59 and exit flow port 61. Molten metal pump 63 is disposed in heating chamber 51 and positioned such that its operation will produce flow of molten metal into melting chamber 53 through entrance flow port 59 and back out of melting chamber 53 into heating chamber 51 through exit flow port 61, followed by a general recirculation of that molten metal back around towards pump 63, as best shown in FIG. 8.

In FIG. 7, light gauge metal scrap 65 is shown disposed on the surface of the molten metal pool within melting chamber 53. The level of the molten metal surface 66 is maintained at an elevational height which is higher than lip 52 of auger assembly 45 such that the molten metal in the melting chamber 53 will flow over the lip 52 of drum 35 and flow down through the bore 37 thereof. This flow pattern is schematically represented in FIG. 4 with the numeral 65 representing the molten metal surface and the direction of gravity flow of the surface area of the molten metal.

In operation, auger assembly 45 is rotated in the direction indicated by arrow 67 in FIG. 2. The principal of the operation of the auger assembly 45, is that the leading edges 31 come into the first contact with any unit of molten metal and light gauge scrap which are encountered by that auger assembly 45. The rotation of auger assembly 45 creates a downwardly spiraled action of the molten metal beneath the surface of the melt. The molten metal which is in both melting chamber 53 and the confines of drum 35, flow generally downwardly from auger 11 and into contact with the flow of molten metal which is moving through melting chamber 53 by virtue of the flow created by pump 63. The flow of molten metal produced by the rotation of auger 11 and auger assembly 45 reduces the level of molten metal within auger assembly 45, above auger 11, as confined by drum 35. Thus, molten metal from the surrounding portions of melting chamber 53 flows by way of gravity over lip 52 into the confines of drum 35.

As the molten metal flows over lip 52 of auger assembly 45 by way of gravity, the light gauge metal scrap floating on the surface of that metal flows with it by gravity following the path of the fluid as it is spiraled downwardly into the central zone of the melt in melting chamber 53. In addition and concurrently, the light metal scrap floating on the surface of that molten metal is physically augered downwardly into the center of the molten metal melt, within the confines of the melting chamber 53, by virtue of the arrangement of the blades 13 of auger 11. The light metal scrap is ultimately forced into contact with the molten metal flowing through melting chamber 53 by virtue of pump 63. The downward spiraled flow created by the rotation of auger assembly 45 needs only to be vigorous enough to create a lowering of the surface level of the molten metal within the confines of drum 35. Auger assembly 45 is positioned relatively near to the molten metal surface 65, with lip 52 being submerged to the extent necessary to create the gravity flow induced by the downward spiraled flow created by the rotation of auger assembly 45. Within the scope of the present invention, the height of lip 52 in relation to molten metal surface 65 may be varied in relation to the number of revolutions per minute at which auger assembly 45 is rotated. Auger assembly 45 is preferably not rotated at a speed which approaches the speed at which substantial quantities of atmospheric gases will be included into the downward spiraled flow of the metal therethrough.

Figure 9:
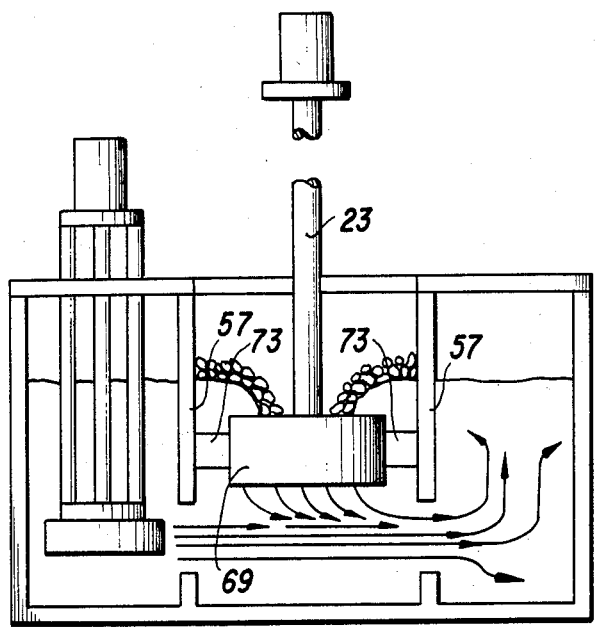
FIG. 9 is an elevational cross-sectional schematic of an alternate arrangement of the light gauge metal scrap melting system.
Figure 10:
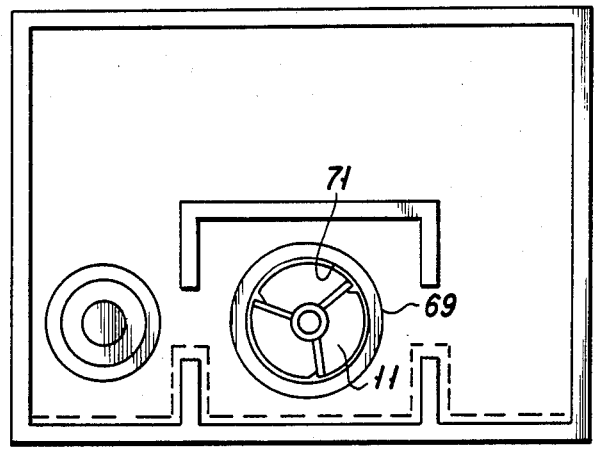
FIG. 10 is a plan view schematic of an alternate arrangement of the light gauge metal scrap melting system.

An alternate embodiment of the light gauge metal scrap melting system is shown in FIGS. 9 and 10. In this alternate embodiment auger 11 is used. However a slightly different design of auger drum 69 is used in that it is merely a hollow cylindrical section shape with a straight inner bore 71 but with no counterbore similar to counterbore 39. The inner bore 71 is sized to be slightly larger than the outer edges 29 of blades 13. Auger drum 69 is stationarily mounted within melting chamber 53 being fixed to walls 57 by mounting spacers 73 about as shown in FIG. 9. Mounting spacers 73 should be made of a refractory or other material which has similar heat resistant properties to those of walls 57. Auger drum 69 may be constructed of materials similar to those used for auger drum 35, but may, alternatively, be constructed of refractory or ceramic materials, known to those with skill in the field, with chemical and mechanical properties acceptable for use in high temperature metal melting furnaces.

In operation, as auger 11 is rotated, auger drum 69 remains stationary. In all other respects, the operation of the light gauge metal scrap melting system is as been previously described.

According to the provisions of the patent statues, which is considered to represent the best embodiment of the present invention, its preferred construction and its best mode of operation have been illustrated and described. However, it is to be understood that, within the scope of the appended claims, the invention may be practiced otherwise than as specifically illustrated and described.

What is claimed is:

1. A system for remelting light gauge scrap metals comprising:
   a. remelting furnace means separated into at least one heating and at least one melting chamber;
   b. heating means associated with and operable on each of said at least one heating chambers but separated from each of said at least one melting chambers;
   c. port means located to enable the flow of molten metal between each of said at least one heating chambers and at least one of said at least one melting chambers and positioned to be below the surface level of molten metal within remelting furnace means;
   d. molten metal pumping means operable to produce a flow of molten metal and positioned to direct said flow of molten metal from each of said at least one heating chambers into at least one of said at least one melting chambers and from each of said at least one melting chambers into at least one of said at least one heating chambers through said port means; and
   e. auger means, separate from said molten metal pumping means, located within each of said at least one melting chambers, positioned below and adjacent to said surface level to produce a gravity flow of said surface level of said molten metal thereto and downwardly therethrough, and operable to mechanically force light gauge scrap metals, which are located adjacent to said surface level of said molten metal, downwardly and substantially beneath said surface level of said molten metal concurrent with said gravity flow of said surface level of said molten metal.

2. The invention of claim 1 wherein each of said at least one heating chambers and at least one of said at least one melting chambers are separated by heat resistant wall means.

3. The invention of claim 2 wherein said port means comprises at least one passageway communicating between each of said at least one heating chambers and at least one of said at least one melting chambers through said heat resistant wall means.

4. The invention of claim 2 wherein said heat resistant wall means comprise at least one refractory wall located to separate each of said at least one heating chambers from at least one of said at least one melting chambers.

5. The invention of claim 4 wherein said port means comprises at least one passageway communicating between each of said at least one heating chambers and at least one of said at least one melting chambers through said heat resistant wall means.

6. The invention of claim 1 wherein said remelting furnace means is separated into a single heating chamber and a single melting chamber and the separation is provided by a heat resistant wall means.

7. The invention of claim 6 wherein said port means comprises at least one passageway communicating between said single heating chamber and said single melting chamber.

8. The invention of claim 7 wherein said at least one passageway comprises a pair of ports located opposite each other and spaced apart, positioned such that molten metal flows in a substantially straight path through one of said ports from said heating chamber into said melting chamber and then through the second of said ports from said melting chamber into said heating chamber.

9. The invention of claim 1 wherein said auger means includes an auger in the form of an axial flow turbine which includes at least one spiral flute.

10. The invention of claims 1, 2, 3, 4, 5, 6, 7, 8 or 9 wherein said auger means comprises:
    a. an axial flow turbine auger with at least one spiral flute;
    b. an auger drum in the form of a hollow cylindrical section, positioned to axially surround said auger, and mounted to said auger; and
    c. means for rotating said auger and said auger drum.

11. The invention of claim 10 wherein said axial flow turbine auger has three spiral flutes.

12. The invention of claims 1, 2, 3, 4, 5, 6, 7, 8 or 9 wherein said auger means comprises:
    a. an axial flow turbine auger with at least one spiral flute;
    b. an auger drum in the form of a hollow cylindrical section, positioned to axially surround said auger but separated therefrom, and stationarily mounted within said at least one melting chamber; and
    c. means for rotating said auger within said auger drum.

13. The invention of claim 12 wherein said axial flow turbine auger has three spiral flutes.

* * * * *